US012775396B2

(12) United States Patent
Chen et al.

(10) Patent No.: US 12,775,396 B2
(45) Date of Patent: Oct. 27, 2026

(54) READ LEVEL ADJUSTMENT FOR MEMORY DEVICE

(71) Applicant: MICRON TECHNOLOGY, INC., Boise, ID (US)

(72) Inventors: Che Chen, Boise, ID (US); Gary F. Besinga, Boise, ID (US); Tawalin Opastrakoon, Boise, ID (US); Michael G. Miller, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/942,203

(22) Filed: Nov. 8, 2024

(65) Prior Publication Data

US 2026/0133699 A1 May 14, 2026

(51) Int. Cl.
*G06F 3/06* (2006.01)

(52) U.S. Cl.
CPC .......... *G06F 3/0619* (2013.01); *G06F 3/0634* (2013.01); *G06F 3/0679* (2013.01)

(58) Field of Classification Search
CPC ..... G06F 3/0619; G06F 3/0634; G06F 3/0679
See application file for complete search history.

(56) References Cited

U.S. PATENT DOCUMENTS 7,408,828 B1 8/2008 Casper
8,767,443 B2 7/2014 Saito
8,929,140 B2 1/2015 Nagashima
9,349,441 B2 5/2016 Radke
2012/0002478 A1 1/2012 Isobe et al.
2012/0268994 A1* 10/2012 Nagashima ............ G11C 16/24 365/185.11
2013/0007344 A1* 1/2013 Belgal ................ G11C 16/3431 711/E12.008
2015/0179284 A1* 6/2015 Alrod .................... G06F 11/076 714/704
2016/0004437 A1* 1/2016 Kim ..................... G11C 29/021 714/764
2016/0147582 A1* 5/2016 Karakulak ............ G06F 11/079 714/37
2024/0272804 A1* 8/2024 Duan .................... G06F 3/0659
2024/0272808 A1* 8/2024 No ...................... G11C 11/5671

* cited by examiner

*Primary Examiner* — Edward J Dudek, Jr.
(74) *Attorney, Agent, or Firm* — Lowenstein Sandler LLP

(57) ABSTRACT

A method for adjusting read levels of a memory device includes detecting, by a drive-adjusted valley track module of a memory controller, a read-intensive workload for the memory device. The method also includes determining, by a drive-adjusted valley track module whether data stored in the memory device related to the read-intensive workload has been exposed to conditions causing errors beyond a correction limit of a valley track module. Responsive to determining the data has been exposed to the conditions, the drive-adjusted valley track module determines a set of read level adjustments for the data. Additionally, the method includes modifying, by the drive-adjusted valley track module, a bin table of the valley track module based on the set of read level adjustments. The method also includes applying, by the valley track module, offset voltage levels from the modified bin table during read operations of the memory device.

20 Claims, 5 Drawing Sheets

300

| VT TAB1 | R1 | R2 | R3 | ... | R14 | R15 |
|---|---|---|---|---|---|---|
| Bin0 | 0 | 0 | 0 | ... | 0 | 0 |
| Bin1 | -3 | -5 | -6 | ... | -9 | -16 |
| Bin2 | -4 | -6 | -7 | ... | -9 | -17 |
| ... | ... | ... | ... | ... | ... | ... |
| Bin6 | -9 | -11 | -12 | ... | -16 | -21 |
| Bin7 | -13 | -15 | -16 | ... | -19 | -24 |

FIG. 3A

350

| VT TAB2 | R1 | R2 | R3 | ... | R14 | R15 |
|---|---|---|---|---|---|---|
| Bin0 | 0 | 0 | 0 | ... | 0 | 0 |
| Bin1 | -3 | -5 | -6 | ... | -9 | -16 |
| Bin2 | -4 | -6 | -7 | ... | -9 | -17 |
| ... | ... | ... | ... | ... | ... | ... |
| Bin6 | -18 | -20 | -21 | ... | -28 | -39 |
| Bin7 | -32 | -34 | -35 | ... | -42 | -45 |

FIG. 3B

READ LEVEL ADJUSTMENT FOR MEMORY DEVICE

TECHNICAL FIELD

This disclosure relates to modifying a bin table of a valley track module to adjust read levels of a memory device.

BACKGROUND

A memory sub-system includes a memory device designed for data storage. These memory devices are implemented as non-volatile and volatile memory devices in various examples. In some such examples, a host system employs a memory sub-system for the purposes of storing data on the memory devices and for retrieving data from the memory devices.

Flash memory retains data by storing electrical charges in floating gates or charge traps within memory cells, with each cell capable of holding different charge levels representing distinct bit values. These stored charges create a barrier effect, altering the transistor's threshold voltage, which is used during read operations to determine the stored value. However, over time, various physical mechanisms cause data retention degradation, primarily due to charge leakage from the storage elements. This leakage occurs naturally due to imperfect insulation and is exacerbated by environmental factors like temperature and repeated program/erase cycles. As charges gradually dissipate, the threshold voltages of memory cells shift, potentially leading to data misinterpretation during read operations. This issue is particularly critical in multi-level cell technologies, where multiple bits are stored in a single cell using different voltage levels, resulting in smaller margins between voltage states.

BRIEF DESCRIPTION OF THE DRAWINGS

FIG. 3A illustrates an example of a preloaded bin table that could be preprogrammed for a valley track module.

FIG. 3B illustrates an example of an extended retention bin table representing a modified version of the preloaded bin table.

DETAILED DESCRIPTION

Figure 1:
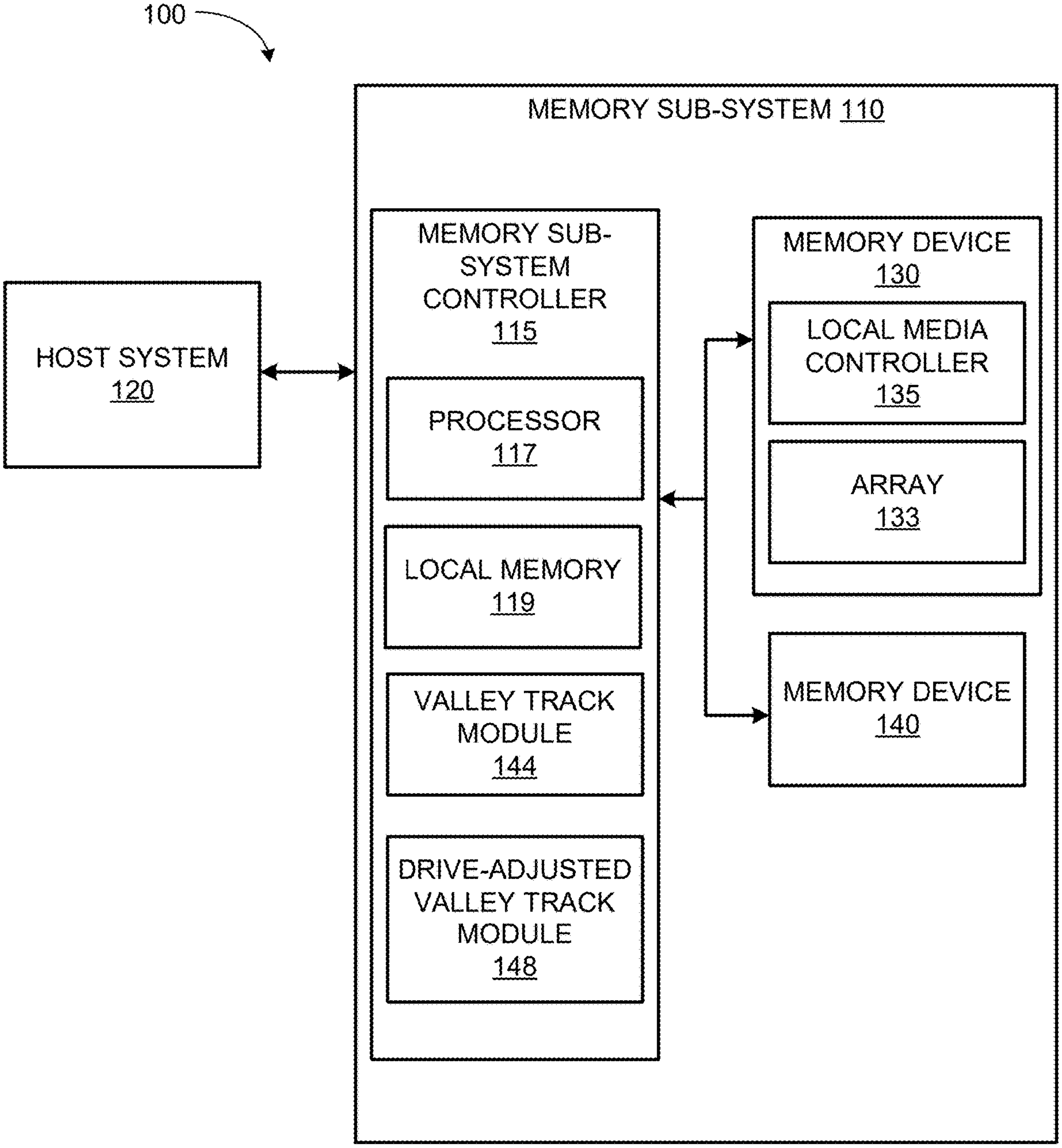
FIG. 1 illustrates a system that includes a memory sub-system that adjusts read offset levels for memory read operations to compensate for charge leakage of memory cells.

This description is related to a drive-adjusted valley track module for curtailing extreme drive retention issues in non-volatile memory. The drive-adjusted valley track feature detects read-intensive workloads (e.g., a folding operation) and retention issues that extend beyond standard correction capabilities. The drive-adjusted valley track module adjusts specific bins of a valley track module to compensate for a charge loss of cells in the non-volatile memory caused by an extended retention duration. Modified offset levels (e.g., offset voltage levels) are reloaded in the non-volatile memory to reduce a Raw Bit Error Rate (RBER) for data exposed to long-term retention conditions. The drive-adjusted valley track module calculates a retention duration based on an identity of a selected bin employed by the valley track module. The drive-adjusted valley track module also includes operations to restore a set of pervious (default) valley track offset levels (e.g., offset voltages) in response to refreshing data on the non-volatile memory that was subject to a retention stress condition (e.g., exposed to the extended retention duration) in a refreshing operation, such that the adjusted offset levels are no longer needed. The refreshing operation can include executing a data scan on the data subject to the retention stress condition, and then rewriting the data in a new block of the non-volatile memory. Accordingly, this drive-adjusted valley track module provides a flexible approach to handling long-term retention issues in non-volatile memory, such as Not-AND (NAND) flash memory, offering improved performance and adaptability in comparison to previous approaches that rely on static offset levels for the valley track module.

More generally, some examples of a memory sub-system include high density non-volatile memory devices where retention of data is desired during intervals of time where no power is supplied to the memory device. One example of non-volatile memory devices is a Not-AND (NAND) memory device. A non-volatile memory device is a package that includes a die(s). Each such die can include a plane(s). For some types of non-volatile memory devices (e.g., NAND memory devices), each plane includes a set of physical blocks, and each physical block includes a set of pages that are organized in wordlines. Each page includes a set of memory cells, which are commonly referred to as cells. A cell is an electronic circuit that stores information. A cell stores at least one bit of binary information and has various logic states that correlate to the number of bits being stored. The logic states are represented by binary values, such as '0' and '1', or as combinations of such values, such as '00', '01', '10' and '11'.

A memory device includes multiple cells arranged in a two-dimensional or a three-dimensional grid. In some examples, memory cells are formed on a silicon wafer in an array of columns connected by conductive lines (also referred to as bitlines, or BLs) and rows connected by conductive lines (also referred to as wordlines or WLs). A wordline has a row of associated memory cells in a memory device that are used with a bitline or multiple bitlines to generate the address of each of the memory cells. The intersection of a bitline and a wordline defines an address of a given memory cell.

A block refers to a unit of the memory device used to store data. In various examples, the unit could be implemented as a group of memory cells, a wordline group, a wordline or as individual memory cells. Multiple blocks are grouped together to form separate partitions (e.g., planes) of the memory device to enable concurrent operations to take place on each plane. A solid-state drive (SSD) is an example of a memory sub-system that includes a non-volatile memory device(s) and a memory sub-system controller to manage the non-volatile memory device(s).

A memory page in the context of non-volatile memory devices, such as NAND memory, refers to a smallest writable and readable unit within the memory structure. Each memory page is formed with numerous memory cells where data is stored. In NAND memory, for example, a memory page is where actual user data gets written along with additional metadata used for managing the memory and ensuring data integrity. This metadata might include error correction codes (ECC) that help detect and correct errors that might occur during data read/write cycles. The size of a memory page can vary depending on the specific type of memory technology and the manufacturer's design. Common page sizes in NAND flash memory range from 4 KB to 16 KB or more.

The memory sub-system controller is configured/programmed to encode host and other data, as part of a write operation, into a format for storage at the memory device(s). Encoding refers to a process of generating parity bits from embedded data (e.g., a sequence of binary bits) using an error correction code (ECC) and combining the parity bits to the embedded data to generate a codeword. LDPC encoding refers to an encoding method that utilizes a low density parity check (LDPC) code to generate the parity bits.

Additionally, the memory sub-system controller can decode codewords, as part of a read operation, stored at the memory device(s) of the memory sub-system. Decoding refers to a process of reconstructing the original embedded data (e.g., sequence of binary bits) from the codeword (e.g., the encoded original embedded data) received from storage at the memory device(s). LDPC decoding refers to a decoding method that utilizes the LDPC code to reconstruct the original embedded data.

Flash memory, such as NAND retains data by storing electrical charges in floating gates or charge traps within the memory cells, with each cell capable of holding different charge levels representing distinct bit values. These stored charges create a barrier effect, altering the transistor's threshold voltage, which is used during read operations to determine the stored value. However, over time, various physical mechanisms cause data retention degradation, primarily due to charge leakage from the storage elements. Moreover, for extended lengths of time (e.g. 1 year or more), the data retention impacts performance of the flash memory. Prior approaches can mitigate this issue for short periods (days or weeks), but these prior approaches do not maintain performance after extended retention periods (one year or more), which is beyond the capability of these prior approaches for mitigating the impact of data retention degradation.

When data is exposed to extended retention periods, the flash memory frequently triggers error handling flows, which results in high system overhead and impacts performance. This situation creates a challenge in meeting performance requirements for scenarios that need reliable data access after extended retention periods. Multi-level flash memory, which stores multiple bits per cell, exacerbates data retention challenges over extended periods. The increased susceptibility to retention issues in these memory technologies stems from the reduced margins between voltage states, making it more difficult to accurately distinguish between different bit values as charge leakage occurs over time.

Valley track is a feature implemented in flash memory to mitigate charge loss issues and improve read performance. A valley track module stores multiple sets of read offset levels (e.g., read offset voltage levels) in NAND memory, which are used during host read operations to retrieve data accurately. These read offset levels are designed to compensate for the shifting of voltage levels that occurs due to charge leakage over time.

The valley track module operates by having a predefined number of bins, each representing different offset levels for various read levels. These bins are set during a probe operation and remain static throughout the life of the flash memory under most circumstances. During host read operations, the valley track module uses these offset levels to adjust the read voltages, helping to maintain low raw bit error rates (RBER) despite the gradual charge loss in the memory cells. However, using static levels for the bins the valley track module has limitations. In particular, although the valley track module is effective for short-term retention scenarios lasting days or weeks, the correction capability of the valley track module is limited under more extreme reliability stress conditions or longer retention periods. In particular, the fixed nature of the offset levels in the standard valley track implementation means that the valley track module may not adequately compensate for charge loss over extended periods, potentially leading to increased error rates and decreased performance in long-term data retention scenarios, such as data retention periods of one year or more.

To compensate for the limitations of the valley track operations executed by the valley track module, the memory controller includes a drive-adjusted valley track module that can enhance the operations of the valley track module. In particular, the drive-adjusted valley track module provides a dynamic solution to address data retention issues in flash memory over extended periods. The drive-adjusted valley track module enhances the standard valley track module by causing the valley track module to adapt read offset levels based on an actual retention state of the data, rather than relying on pre-set levels.

The drive-adjusted valley track module is configured to detect a read-intensive workload executed by the controller. The read-intensive workload, could be for example, a host read operation or an QLC-to-QLC folding operation, or other type of folding operation. In response, the drive-adjusted valley track module determines if the data to be retrieved in the read-intensive workload in the flash memory has been exposed to reliability conditions, such as the extended retention duration that cause error rates in the data that exceed a correction limit of the valley track module. If such conditions are detected, the drive-adjusted valley track module determines a set of read level adjustments. In some examples, the set of read levels adjustments are based on a particular read level, such as a highest read level (e.g., R15 for a QLC flash memory). Based on this calculation, the drive-adjusted valley track module modifies read offset levels of certain bins of offset levels in the valley track module designed to compensate for the charge loss that has occurred during the extended retention period.

More particularly, the valley track module adjusts the read voltage offset levels to assign larger offset levels (e.g., more negative) to higher-numbered bins (e.g., a penultimate bin and a last bin) in the valley track offset table. When reading cells that have experienced excessive charge loss, these adjusted read voltage offset levels are used by the valley track module to reduce a raw bit error rate (RBER) of read operations. Contemporaneously, the drive-adjusted valley track module can monitor the valley track module to identify a selected bin employed for read operations of the read-intensive workload. The selected bin can be employed to estimate a retention period for data of the read operations. Additionally, the drive-adjusted valley track module detects that the read intensive workload has completed. Responsive to detecting the completion, the drive-adjusted valley track module restores the read offset levels for bins employed by the valley track feature to default read offset levels. Additionally, the memory controller can execute a refresh operation on the data read exposed to a retention stress condition for the read intensive workload to restore the charge of the memory cells. The refresh operation can include executing a data scan on data that was subject to the retention stress condition, and then the memory controller can rewrite the data in a new block. This adaptive approach provided by drive-adjusted valley track module enhances flexibility in managing flash memory, to reduce performance issues related to error handling after extended retention periods or other reliability corners. Moreover, the drive-adjusted valley track module can be leveraged to address challenges posed by flash memories that implement multi-level cell technologies while maintaining data integrity and read performance.

FIG. 1 illustrates a system 100 that includes a memory sub-system 110 that can be a storage device, a memory module, or a hybrid of a storage device and a memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card and a hard disk drive (HDD). Examples of memory modules include a dual in-line memory module (DIMM), a small outline DIMM (SO-DIMM) and various types of non-volatile dual in-line memory modules (NVDIMMs).

The system 100 can be a computing device such as a desktop computer, laptop computer, network server, mobile device, a vehicle (e.g., airplane, drone, train, automobile or other conveyance), Internet of Things (IoT) enabled device, embedded computer (e.g., one included in a vehicle, industrial equipment or a networked commercial device) or such computing device that includes memory and a processing device. The system 100 can include a host system 120 that is coupled to one or more memory sub-systems 110. In some examples, the host system 120 is coupled to different types of the memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller) and a storage protocol controller (e.g., PCIe controller, SATA controller, CXL controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a compute express link (CXL) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory device(s) 130) when the memory sub-system 110 is coupled with the host system 120 by the physical host interface (e.g., PCIe or CXL bus). The physical host interface can provide an interface for passing control, address, data and other signals between the memory sub-system 110 and the host system 120. FIG. 1 illustrates a memory sub-system 110 as an example. In general, the host system 120 can access multiple memory sub-systems via a same communication connection, multiple separate communication connections and/or a combination of communication connections.

The memory device 130 and the memory device 140 are implemented as non-volatile, non-transitory computer readable media. The memory device 130 and the memory device 140 can include any combination of the different types of non-volatile memory devices. Some examples of non-volatile memory devices (e.g., memory device(s) 130) include Not-AND (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory device(s) 130 include an array 133 (or multiple arrays) of memory cells. One type of memory cell, for example, single level cells (SLC) can store one bit per cell. Other types of memory cells, such as multi-level cells (MLCs), triple level cells (TLCs), quad-level cells (QLCs) and penta-level cells (PLCs) or higher, can store multiple bits per cell. In some examples, each of the memory devices 130 can have a combination of different types of memory cells such as SLCs, MLCs, TLCs, QLCs, PLCs or some combination thereof. For instance, in some examples, a particular memory device can include an SLC portion, an MLC portion, a TLC portion, a QLC portion and/or a PLC portion of memory cells. The memory cells of the memory devices 130 can be grouped as pages that can refer to a logical unit of the memory device used to store data. In some types of memory (e.g., NAND), pages can be grouped into wordlines and blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM), etc.

A memory sub-system controller 115 (alternatively referred to as a memory controller or a controller simplicity) communicates with the memory device(s) 130 to perform operations such as reading data, writing data or erasing data at the memory devices 130 and other such operations. The memory sub-system controller 115 can include hardware such as one or more integrated circuits and/or discrete components, a buffer memory or some combination thereof. The hardware can include digital circuitry with dedicated (e.g., hard-coded) logic to perform the operations described herein. The memory sub-system controller 115 can be a microcontroller, special purpose logic circuitry (e.g., a field programmable gate array (FPGA), an application specific integrated circuit (ASIC), etc.) or other suitable processor.

The memory sub-system controller 115 can include a processing device, which includes one or more processors (e.g., the processor 117), configured to execute instructions stored in a local memory 119. In the illustrated example, the local memory 119 of the memory sub-system controller 115 includes an embedded memory configured to store instructions for performing various processes, operations, logic flows and routines that control operation of the memory sub-system 110, including handling communications between the memory sub-system 110 and the host system 120. The local memory 119 is a non-transitory computer-readable medium.

In some examples, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another example, a memory sub-system 110 does not include a memory sub-system controller 115 and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations and address translations between a logical address (e.g., a logical block address (LBA), namespace) and a physical address (e.g., physical block address) that are associated with the memory devices 130. The memory sub-system controller 115, for example, may employ a Flash Translation Layer (FTL) to translate logical addresses to corresponding physical memory addresses, which can be stored in one or more FTL mapping tables. In some instances, the FTL mapping table can be referred to as a logical-to-physical (L2P) mapping table storing L2P mapping information. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. For example, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some examples, the memory devices 130 include local media controllers 135 that operate in concert with the memory sub-system controller 115 to execute operations on one or more memory cells of the memory devices 130. An external controller (e.g., the memory sub-system controller 115) can externally manage the memory device 130 (e.g., perform media management operations on the memory device 130). In some examples, the memory sub-system 110 is a managed memory device, which is a raw memory device 130 having control logic (e.g., local media controller 135) on the die and a controller (e.g., the memory sub-system controller 115) for media management within the same memory device package. An example of a managed memory device is a managed NAND (MNAND) device.

The memory sub-system controller 115 executes several operations to execute a write command to the memory device(s) 130. In particular, the memory sub-system controller 115 receives the write command from the host system 120 via the physical host interface. The write command includes user data (e.g., host data). The memory sub-system controller 115 then encodes the user data and other data (e.g., parity data) into a format suitable for storage in the memory device 130. This encoding process involves generating parity bits from the embedded data using an ECC and combining the parity bits of the other data with the user data to create a codeword. If the memory sub-system controller 115 employs LDPC encoding, the memory sub-system controller 115 generates the parity bits using an LDPC code.

The memory sub-system controller 115 then sends the codeword to the memory device(s) 130. Within the memory device(s) 130, the local media controller 135 receives the codeword data and manages the actual writing process to the array 133. The codeword is written to the array 133, which is formed with memory cells organized into pages, which range in size from 4 KB to 16 KB or more. The codeword is stored in the memory cells of the array 133 as electrical charges in floating gates or charge traps. Each cell can hold different charge levels, representing distinct bit values. In situations where the memory device 130 employs multi-level cell technologies, such as QLC, multiple bits are stored in a single cell using different voltage levels.

The memory sub-system controller 115 includes a valley track module 144 that stores machine-readable instructions. The valley track module 144 is designed to curtail charge loss issues and improve read performance in the memory device(s) 130. The valley track module 144 has a bin table that stores bins of read offset levels (e.g., read offset voltage levels) for the memory device(s) 130, which are used during host read operations to retrieve data accurately. The valley track module 144 operates by maintaining a predefined number of bins, each representing different offset levels for various read levels. These bins are set during a probing process for the memory device(s) 130 and mostly remain static throughout the life of the memory device(s) 130. During host read operations, the valley track module 144 uses these offset levels to adjust the read voltages applied to the array 133 of the memory device 130. This adjustment helps maintain low raw bit error rates (RBER) despite the gradual charge loss in the memory cells of the array 133.

More specifically, a read command from the memory device 130 causes the memory sub-system controller 115 to execute several operations. The memory sub-system controller 115 receives the read command from the host system 120 via the physical host interface. In response, the memory sub-system controller 115 sends the read command to the memory device(s) 130 that include the memory addresses specified in the read command. The local media controller 135 manages the actual reading process from the array 133.

During the read operation, the memory sub-system controller 115 uses the valley track module 144 to adjust the read voltages applied to the array 133. The valley track module 144 uses pre-stored offset levels to compensate for charge loss in the memory cells, which occurs over time due to data retention issues. More particularly, as data is stored in the memory cells as electrical charges, these charges can leak over time, causing the threshold voltages of the cells to shift. This shift is particularly problematic in multi-level cell technologies, where the margins between voltage states are smaller. The charge leakage can lead to misinterpretation of the stored data during read operations, potentially increasing the RBER.

During a read operation, the valley track module 144 in the memory sub-system controller 115 applies offset levels sequentially to compensate for charge loss in the memory device 130. The process begins with the preloaded offset levels from a bin of a bin table (typically offset levels defined in Bin0) and progresses through higher-numbered bins as needed. For each read attempt, the valley track module 144 applies the offset levels from a selected (e.g., active) bin to adjust the read voltages. If the read operation results in an acceptable RBER, the valley track module 144 continues to use the offset levels in the selected bin for the remainder of that particular read operation. Conversely, if the initial read attempt does not yield an acceptable RBER, the valley track module 144 moves to the next higher-numbered bin and applies a next set of offset levels in the next higher-number bin. By iteratively applying different offset levels, the valley track module 144 can adapt to varying levels of charge loss in different parts of the memory device 130, helping to maintain read performance and data integrity over time. This process continues until an acceptable RBER is achieved or all bins have been tried. In such cases, the read operation may result in increased error rates, potentially triggering read error handling (REH) flows, which can impact performance.

Responsive to reading codewords from the array 133, the memory sub-system controller 115 decodes the codewords stored in the memory device 130. This decoding process involves reconstructing the user data from the codeword using ECC. If LDPC decoding is employed, the memory sub-system controller 115 uses the LDPC code to reconstruct the user data.

In cases where the data retention issues are severe, the standard read operation may not be sufficient to accurately retrieve the data. This situation can lead to overhead (e.g., excessive amount of error correction) of the memory sub-system controller 115 and decreased performance, particularly for scenarios requiring reliable data access after extended retention periods.

To compensate for the charge leak caused by extended retention periods, the memory sub-system controller 115 includes a drive-adjusted valley track module 148. The drive-adjusted valley track module 148 executes a series of dynamic adjustments and calculations for the memory device(s) 130. The drive-adjusted valley track module 148 is configured to monitor the read commands processed by the memory sub-system controller 115. In response to detecting a read-intensive workload, such as a read command such as host read of 10 Megabytes or more, or a QLC-to-QLC folding operation, the drive-adjusted valley track module 148 examines the memory device 130 to determine if the data in the memory device 130 has been exposed to conditions causing errors beyond a correction limit of the valley track module 144, such as exposed to an extended retention period.

The determination that data has exposed to extended retention beyond the correction capability of default valley track offset levels can be made analyzing a performance of the initial read attempts using the default offset (typically Bin0) and possibly a few subsequent bins. If these initial attempts result in higher-than-expected RBER or require the use of higher-numbered bins more frequently than usual, this can indicate that the data has been exposed to the extended retention period, such that operations are drive-adjusted valley track module 148 are needed. By analyzing these factors early in the read process, the drive-adjusted valley track module 148 can determine if the data is likely to be beyond the correction capability of the valley track module 144 correction capability without exhaustively trying all bins. This allows for a more efficient and proactive approach to addressing retention issues.

Figure 2:
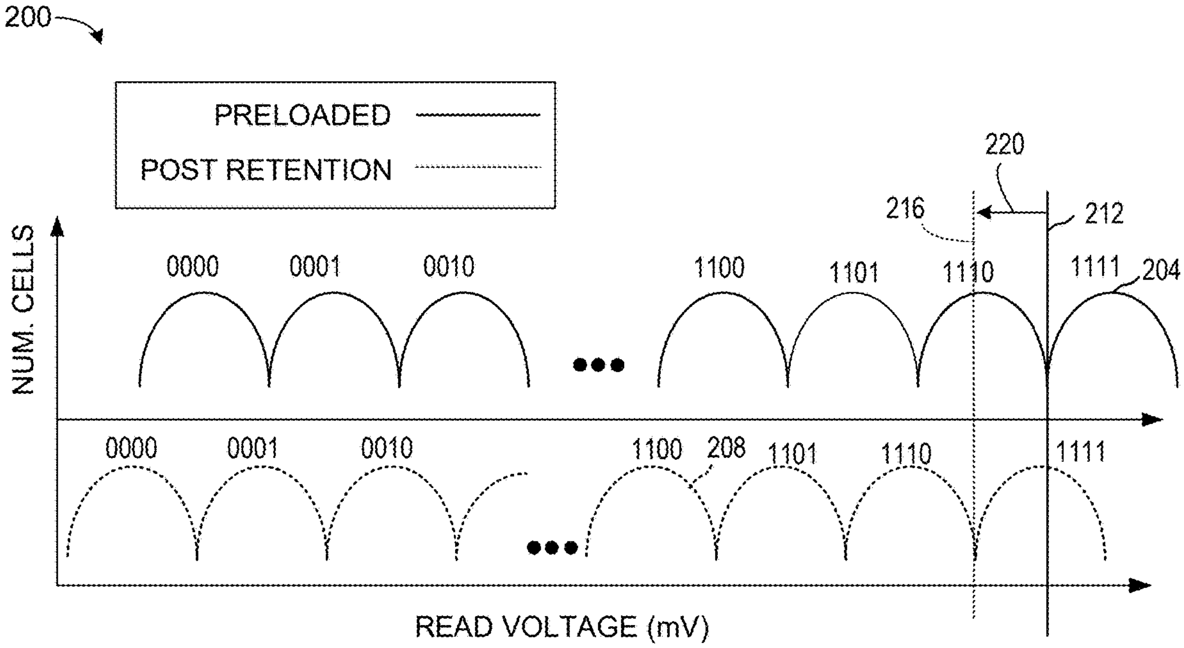
FIG. 2 illustrates a graph that a represents a distribution of a number of cells in the memory device plotted as a function of a read voltage.

In response to detecting the extended retention period, the drive-adjusted valley track module 148 measures a read level adjustment, or multiple read level adjustments for data in the memory device 130 exposed to the extended retention period. FIG. 2 illustrates a graph 200 that represents a distribution of a number of cells in the memory device 130 plotted as a function of a read voltage, in millivolts (mV). In the example illustrated, the memory device 130 is a QLC NAND flash memory device, such that each cell of the memory device 130 has sixteen states labeled 0000 . . . 1111 (states 0011 . . . 1011 have been omitted for drawing clarity). The example provided in FIG. 2 is only one such possible order of cell states, and in other examples, other orders are employable. The drive-adjusted valley track module 148 can be preprogrammed with preloaded read levels (labeled "PRELOADED") that are plotted on the graph 200 with a preloaded plot 204. The graph 200 also includes a post retention plot 208 that plots a distribution of read voltages for the memory device 130 after the extended retention period (labeled "POST RETENTION"). The preloaded plot 204 and the post retention plot 208 are plotted on separate axes (e.g., as separate panels) that represent the same scale and values to improve visual clarity of the graph 200. The preloaded plot 204 and the post retention plot 208 have portions that each correspond to a particular state. Each read level, R1 . . . R15 corresponds to a valley present between portions of the preloaded plot 204 or the post retention plot 208.

In the example illustrated, a last read level, R15 represents a read level between a fifteenth state (1110) and a sixteenth state (1110). The preloaded plot 204 includes an initial marker 212 representing the last read level R15 of the preloaded read levels. The post retention plot 208 includes an offset marker 216 representing the last read level R15 after the retention period. The change 220 in the voltage level from the initial marker 212 (representing the preloaded state) to the offset marker 216 (representing the post retention state), can define a shift in the last valley of read levels of the memory device 130, corresponding to a read level adjustment for the last read level R15. In some examples, the drive-adjusted valley track module 148 can determine a read level adjustment for the other read levels, R1 . . . R14 based on the read level adjustment for the last read level R15. As yet another example, the drive-adjusted valley track module 148 can determine a read level adjustment for a subset of the other read levels R1 . . . . R14. For example, the drive-adjusted valley track module 148 could determine a subset of read levels, R5, R10 and R15. In this example, the drive-adjusted valley track module 148 could set the read level adjustment for read levels R1 . . . R4 based on the read level R5, set the read levels R6-R9 based on the read level R10 and set the read levels R11 . . . R14 on the last read level, R15.

Referring back to FIG. 1, the valley track module 144 stores a bin table that defines an offset shift for 8 different bins, namely Bin 0 . . . Bin7. The bin table could be stored, for example in the local memory 119. FIG. 3A illustrates an example of a preloaded bin table 300 labeled "VT TAB1" that could be preprogrammed for the valley track module 144. As illustrated, each of the 8 bins contains 15 read levels, namely R1 . . . R15. Thus, in the example illustrated, the memory device 130 is a QLC NAND flash memory device. Each column for each bin represents an offset level (in mV) for a read level. As shown in the preloaded bin table 300, the offset levels becomes greater (e.g., more negative) as the bin number increases.

Referring back to FIG. 1, the drive-adjusted valley track module 148 can be configured to adjust the offset levels of the penultimate (e.g., seventh) and last (e.g., eight) bins, namely Bin6 and Bin7 based on the adjusted read levels for R1 . . . R15. FIG. 3B illustrates an example, of an extended retention bin table 350 labeled "VT TAB2" that represents a modified version of the preloaded bin table 300. The first to sixth bins, namely Bin0 . . . Bin5 of the extended retention bin table 350 have the same offset levels as the preloaded bin table 300. However, the penultimate and last bins, Bin6 and Bin7 of the extended retention bin table 350 have modified offset levels relative to the preloaded bin table 300, as indicated by the shaded cells. More specifically, the read level adjustments determined for R1 . . . R15 explained with respect to FIG. 2 is added to the offset levels. Because the read level adjustments and the offset levels are negative in most cases, adding the read level adjustments make the offset levels more negative (e.g., defining a greater negative offset voltage).

Referring back to FIG. 1, the read level adjustments are designed to compensate for the charge loss that has occurred during the extended retention period by assigning more negative offset levels to penultimate bin and the last bin, namely Bin6 and Bin7 in the valley track offset table. When reading cells that have experienced excessive charge loss, these adjusted offset levels are used by the valley track module 144 to reduce the raw bit error rate (RBER) of read operations for the read-intensive workload. This adaptive approach allows for improved read performance even after long retention periods, addressing the limitations of the valley track module 144 (with the preloaded bin table). The drive-adjusted valley track module 148 continuously monitors the data retention state and adjusts the offset levels as needed, providing flexibility throughout a life of the memory device 130.

Responsive to the drive-adjusted valley track module 148 modifying the bin table, the valley track module 144 applies offset levels sequentially, starting from a default offset (typically Bin0) and progressing through higher-numbered bins as needed. In response to the valley track module 144 reaching the modified bins (Bin6 and Bin7), the valley track module 144 uses the updated offset levels that were adjusted to compensate for the extended retention period. The process is iterative. More specifically, the valley track module 144 starts with the default offset (Bin0) for a read operation. If an acceptable raw bit error rate (RBER) is not achieved, the valley track module 144 progresses to the next bin. This continues until an acceptable RBER is achieved or all bins have been tried. Once an acceptable RBER is achieved using a selected bin for a specific read operation, the offset levels of the selected bin continue to be used for the remainder of that read operation. Additionally, for subsequent read operations of the read-intensive workload, the process starts anew, allowing the valley track module 144 to adapt to varying levels of charge loss in different parts of the memory device 130.

After the bin table is modified by the drive-adjusted valley track module 148, the valley track module 144 uses the modified bins (Bin6 and Bin7), such that the valley track module 144 applies the larger offset levels (e.g., more negative offset levels) that were calculated by the drive-adjusted valley track module 148 to compensate for the greater charge loss experienced by cells after extended retention. These adjusted offset levels in the higher-numbered bins allow the valley track module 144 to more effectively read data from cells that have undergone significant charge loss due to long-term retention. Accordingly, the drive-adjusted valley track module 148 and the valley track module 144 operation in concert to maintain read performance and reduce the frequency of triggering error handling flows for data exposed to extended retention periods.

Contemporaneously, the drive-adjusted valley track module 148 monitors the operations of the valley track module 144 to identify the selected bin for the read operation. The drive-adjusted valley track module 148 employs the selected bin to estimate a retention duration for the data in the memory device 130 requested in the read command. The drive-adjusted valley track module 148 leverages a relationship between the valley track bins and the passage of time. As noted, the valley track module 144 of the memory sub-system controller 115 maintains a predefined number of bins, typically 8 to 11, which are set during the probe process for the memory device 130. Each bin corresponds to a specific amount of bake time, representing a particular retention period. As the bin numbers increase from low to higher (e.g., from 5 to 6 to 7), each bin represents a progressively longer retention period. Accordingly, the drive-adjusted valley track module 148 executes a bin analysis to determine the selected bin used by the valley track module 144 for execution of the read operation. The selected bin number provides an estimate of how long the stored data in the memory device has been retained in the array 133 of the memory device 130. For instance, if a lower-numbered bin is selected for the read operation (e.g., Bin0 . . . Bin2), this indicates a shorter retention period. This relationship between the selected bin for read operations and the retention period enables an estimation of the retention time without requiring more complex calculations. The information gathered from this bin analysis is leveraged by the drive-adjusted valley track module 148 to determine if the data in the memory device 130 has been exposed to significant retention duration beyond the correction capability of the default valley track offset levels used by the valley track module 144. In other examples, the retention duration can be estimated by the drive-adjusted valley track module 148 using techniques such as course threshold estimation (CTE) or correction fail bit (CFBit) calibration. The retention duration can be stored in a log file in the local memory 119. The retention duration can be employed, for example for drive analysis and/or for other operations of the memory sub-system controller 115.

The drive-adjusted valley track module 148 also includes operations to detect when the read-intensive workload has completed. Upon detection of completion, the drive-adjusted valley track module 148 restores the offset levels in the bin table employed by the valley track module 144 to the offset levels in the default bin table. This restoration is executed once the data that is subject to a retention stress condition (e.g., the extended retention period) has been refreshed (e.g., in a refresh operation executed by the memory sub-system controller 115). The refreshing can include executing a data scan on the data that is subject to the retention stress condition, then rewrite the data in a new block. This restoration can additionally or alternatively be executed in situations where the extended offset levels are no longer needed, ensuring satisfactory performance across various retention scenarios.

By dynamically adjusting the valley track offset levels based on the actual retention state of the data, the drive-adjusted valley track module 148 provides enhanced flexibility in managing the memory sub-system 110. Leveraging the drive-adjusted valley track module 148 addresses performance issues and reduced trigger rates for error handling caused by extended retention periods or other reliability corners.

The drive-adjusted valley track module 148 also takes into account the specific characteristics of multi-level cell technologies, such as QLC (Quad-Level Cell) NAND flash memory. In these multi-level memory cell technologies, the margins between voltage states are smaller, making memory devices (e.g., the memory device(s) 130) that employ multi-level cells more susceptible to retention issues. The ability of the drive-adjusted valley track module 148 to finely tune the offset levels for each read level based on the read level adjustments helps maintain a distinction between these closely spaced voltage states, even after extended periods of retention.

Accordingly, the drive-adjusted valley track module 148 provides a dynamic solution to the challenges posed by extended data retention in flash memory. By adapting to the actual retention state of the data and making precise adjustments to the valley track offset levels, this the drive-adjusted valley track module 148 enhances the reliability and performance of read operations, particularly in scenarios involving long-term data storage.

Figure 4:
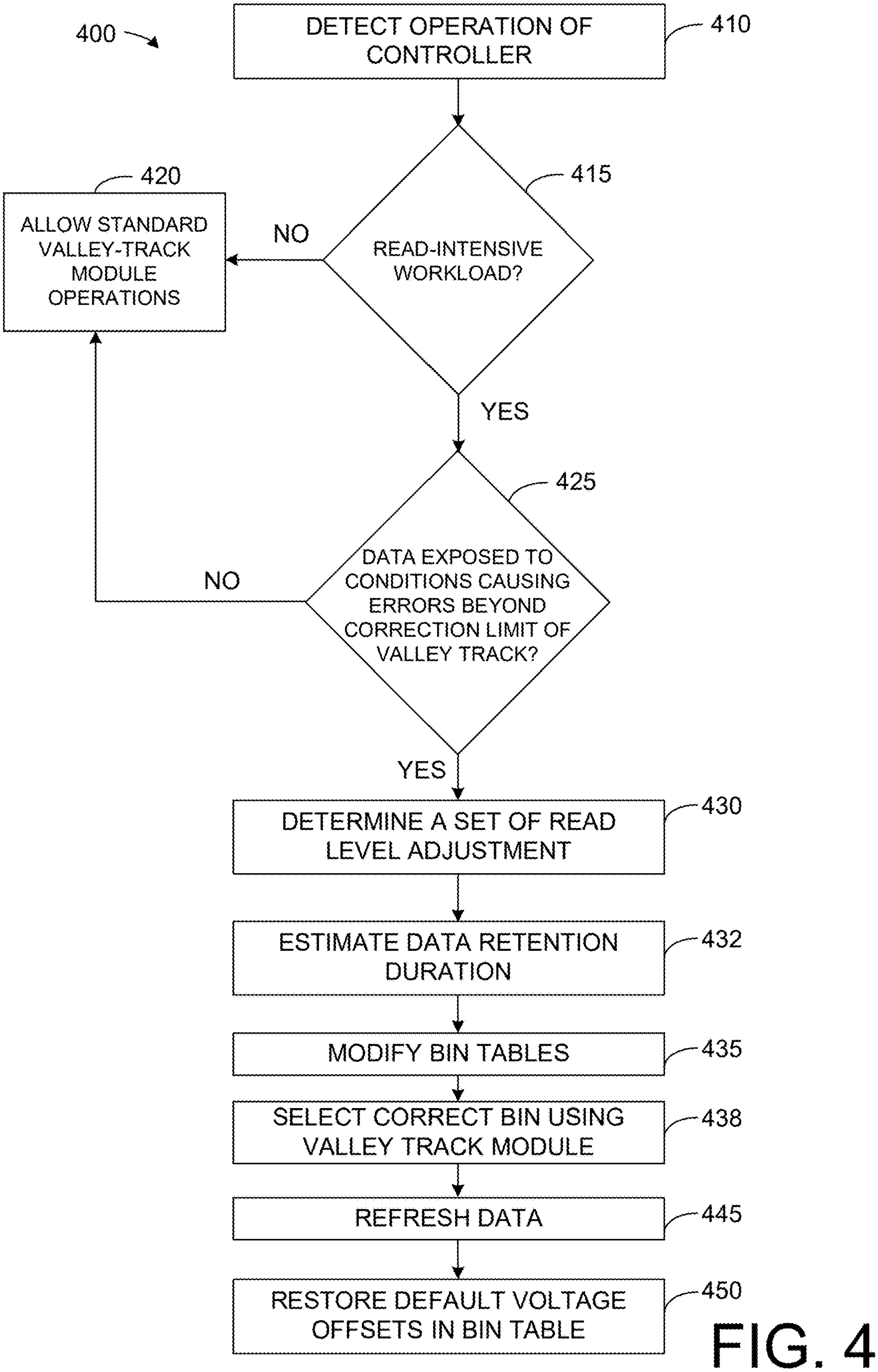
FIG. 4 illustrates a flowchart of an example method for adjusting read offset levels of a valley track module for a read-intensive workload.

FIG. 4 illustrates a flowchart of an example method 400 for adjusting read level offset levels of a valley track module (e.g., the valley track module 144) for a read-intensive workload. The method 400 can be implemented by the memory sub-system controller 115, including features of a drive-adjusted valley track module (e.g., the drive-adjusted valley track module 148) and the valley track module.

At block 410, the drive-adjusted valley track module detects an operation to be executed by the controller. At block 415, the drive-adjusted valley track module makes a determination as to whether the detected operation is a read-intensive workload. If the determination at block 415 is negative (e.g., NO), the method 400 proceeds to block 420. If the determination at block 415 is positive (e.g., YES), the method 400 proceeds to block 425. At block 425, the drive-adjusted valley track module takes no action, allowing standard valley track module operations (e.g., using the preloaded bin table 300) for the detected operation.

At block 425, the drive-adjusted valley track module determines whether data stored in a memory device (e.g., the memory device 130) has been exposed to conditions causing errors beyond a correction limit of the valley track module, such as reliability corners from an extended retention duration. If the determination at block 425 is negative (e.g., NO), the method 400 proceeds to block 420. If the determination at block 425 is positive (e.g., YES), the method 400 proceeds to block 430.

At block 430, the drive-adjusted valley track module determines a set of read level adjustments for data in a read operation of the read-intensive workload. To measure the set of read level adjustments, the drive-adjusted valley track module identifies a shift in a valley, such as a last valley of read levels of the memory device, as described with respect to FIG. 2. In some examples, the drive-adjusted valley track module measures a read level shift for the last read level (e.g., R15) in the memory device to determine a last read level adjustment, and bases the remaining read level adjustments on this last read level adjustment. In other examples, the drive-adjusted valley track module measures each read level shift (e.g., each valley) or some subset thereof to determine the set of read level adjustments. At block 432, the drive-adjusted valley track module estimates a data retention duration. The drive-adjusted valley track module estimates the data retention duration for each read operation in the read-intensive workload by monitoring for a selected bin used by the valley track module for such read operations.

At block 435, the drive-adjusted valley track module modifies the bin tables of the valley track module based on the set of read level adjustments. In particular, the drive-adjusted valley track module modifies the voltage offset levels for the penultimate and last bin (e.g., Bin6 and Bin7, as illustrated in FIG. 3B) of the bin table to compensate for the charge loss.

At block 438, the valley track module applies offset levels sequentially, starting from the default offset (Bin0) and progressing through higher bins as needed to select a correct bin from the bin table. For modified bins (the penultimate and last bin), the valley track module employs adjusted offset voltages to compensate for the extended retention duration. The process iterates through bins until an acceptable RBER is achieved or all bins are tried. Once an acceptable RBER is found, the valley track module selects the bin with the acceptable RBER for the remainder of this individual read operation of the read-intensive workload. For subsequent read operations, the process for selecting a different bin restarts, enabling adaptation to varying charge loss levels in different memory areas.

At block 445, the controller refreshes data that is subject to the retention stress condition. The refreshing can include executing a data scan on the data that is subject to the retention stress condition, then rewrite the data in a new block.

At block 450, the drive-adjusted valley track module restores the default offset levels in the bin table of the valley track module. In particular, because the data has been refreshed, the adjusted offset levels are no longer needed. Accordingly, the drive-adjusted valley track module can restore the default offset levels in the bin table to the default offset levels for subsequent operations of the memory controller. The method 400 allows for dynamic adjustment of the offset levels of the valley track module based on the actual retention state of the data providing enhanced flexibility in managing the memory sub-system and improving performance for data exposed to extended retention periods.

Figure 5:
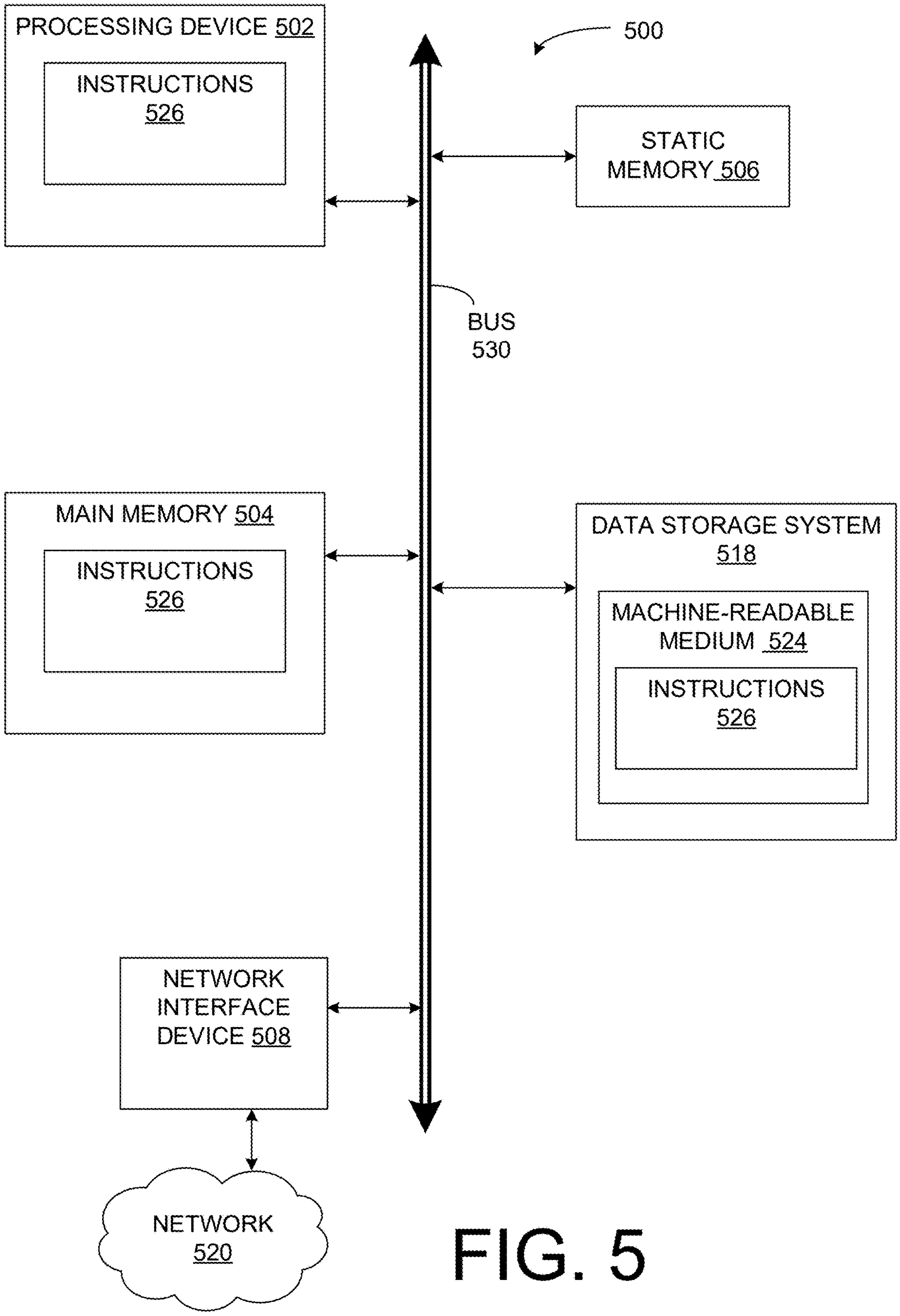
FIG. 5 illustrates an example machine of a computer system (a machine) within which a set of instructions, for causing the machine to perform any one or more of the methodologies discussed herein, can be executed.

FIG. 5 illustrates an example machine of a computer system 500 (a machine) within which a set of instructions, for causing the machine to perform any one or more of the methodologies discussed herein, can be executed. In some examples, the computer system 500 corresponds to a host system (e.g., the host system 120 of FIG. 1) that includes, is coupled to, or utilizes a memory sub-system (e.g., the memory sub-system 110 of FIG. 1) or is used to perform the operations of a controller. In other examples, the machine is connected (e.g., networked) to other machines in a LAN, an intranet, an extranet and/or the Internet. In various examples, the machine operates in the capacity of a server or a client machine in client server network environment, as a peer machine in a peer-to-peer (or distributed) network environment or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge or any machine capable of executing a set of instructions (sequential or otherwise) that specify actions to be taken by that machine. In other examples, the machine may be a computer within an automobile, a data center, a smart factory or other industrial application. Further, while a single machine is illustrated, the term "machine" shall also be taken to include any collection of machines that individually or jointly execute a set (or multiple sets) of instructions to perform the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM) or other non-transitory computer-readable media) and a data storage system 518, which communicate with each other via a bus 530.

The processing device 502 represents one or more general-purpose processing devices such as a microprocessor, a central processing unit, etc. More particularly, the processing device 502 can be a complex instruction set computing (CISC) microprocessor, reduced instruction set computing (RISC) microprocessor, very long instruction word (VLIW) microprocessor or a processor implementing other instruction sets or processors implementing a combination of instruction sets. In some examples, the processing device 502 is implemented with a special-purpose processing devices such as an application specific integrated circuit (ASIC), a field programmable gate array (FPGA), a digital signal processor (DSP), network processor, etc. The processing device 502 is configured to execute instructions 526 for performing the operations discussed herein. In some examples, the computer system 500 includes a network interface device 508 to communicate over the network 520.

The data storage system 518 includes a machine-readable storage medium 524 (also known as a computer-readable medium) that store sets of instructions 526 or software for executing the methodologies and/or functions described herein. The machine-readable storage medium 524 is a non-transitory medium. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518 and/or main memory 504 can correspond to the memory sub-system 110 of FIG. 1. Accordingly, the machine-readable storage medium 524, the data storage system 518 and/or the main memory 504 are examples of non-transitory computer-readable media.

In some examples, the instructions 526 include instructions to a data write and/or a data integrity scan. While the machine-readable storage medium 524 is shown in an example to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared and otherwise manipulated. It has proven convenient at times, principally for reasons of common usage, to refer to these signals as bits, values, elements, symbols, characters, terms, numbers, etc.

It is noted, however, that all of these and similar terms are to be associated with the appropriate physical quantities and are merely convenient labels applied to these quantities. This description can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

This description also relates to an apparatus for performing the operations herein. This apparatus can be specially constructed for the intended purposes or this apparatus can include a general purpose computer selectively activated or reconfigured by a computer program stored in the computer. Such a computer program can be stored in a computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards or any type of media suitable for storing electronic instructions, each coupled to a computer system bus.

The algorithms and displays presented herein are not inherently related to any particular computer or other apparatus. Various general purpose systems can be used with programs in accordance with the descriptions herein, or it can prove convenient to construct a more specialized apparatus to perform the method. In addition, the present disclosure is not described with reference to any particular programming language. It will be appreciated that a variety of programming languages can be used to implement the teachings of the disclosure as described herein.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications and variations that fall within the scope of this application, including the appended claims. As used herein, the term "includes" means includes but not limited to, the term "including" means including but not limited to. The term "based on" means "based at least in part on". Additionally, where the disclosure or claims recite "a," "an," "a first" or "another" element, or the equivalent thereof, it should be interpreted to include one or more than one such element, neither requiring nor excluding two or more such elements.

What is claimed is:

1. A method for adjusting read levels of a memory device, the method comprising:

detecting, by a drive-adjusted valley track module of a memory controller, a read-intensive workload for the memory device;

determining, by the drive-adjusted valley track module whether data stored in the memory device related to the read-intensive workload has been exposed to conditions causing errors beyond a correction limit of the drive-adjusted valley track module;

responsive to determining the data has been exposed to the conditions, determining, by the drive-adjusted valley track module, a set of read level adjustments for the data;

modifying, by the drive-adjusted valley track module, a bin table of the drive-adjusted valley track module based on the set of read level adjustments, wherein the bin table stores read voltage offset levels, indexed by bin number and read level, that are applied sequentially during read operations of the memory device starting from a first bin through higher-numbered bins until an acceptable raw bit error rate (RBER) is achieved; and applying, by the drive-adjusted valley track module, offset voltage levels from the modified bin table during read operations of the memory device.

2. The method of claim 1, wherein determining the set of read level adjustments comprises measuring a shift in a last valley of read levels of the memory device.

3. The method of claim 1, wherein modifying the bin table comprises adjusting offset voltage levels for a penultimate bin and a last bin of the bin table.

4. The method of claim 1, further comprising estimating, by the drive-adjusted valley track module, a data retention duration based on a selected bin used by the drive-adjusted valley track module for read operations of the read-intensive workload.

5. The method of claim 1, further comprising:

refreshing, by the memory controller, the data retrieved in a read operation for the read-intensive workload in the memory device; and restoring, by the memory controller, default offset voltage levels in the bin table in response to detecting completion of the read-intensive workload.

6. The method of claim 1, wherein applying offset voltage levels comprises applying, by the drive-adjusted valley track module, offset voltage levels from a first bin of the bin table through higher-numbered bins until an acceptable raw bit error rate (RBER) is achieved.

7. The method of claim 1, wherein determining whether data stored in the memory device has been exposed to conditions causing errors beyond a correction limit comprises analyzing performance of initial read attempts using offset voltage levels from bins of the bin table prior to the modifying.

8. The method of claim 1, wherein the memory device is a quad-level cell (QLC) Not-AND (NAND) flash memory device.

9. The method of claim 8, wherein the read-intensive workload comprises a host read operation or a QLC-to-QLC folding operation.

10. The method of claim 1, wherein:

the read voltage offset levels stored in the bin table are negative voltage offset levels that shift the read voltages applied to the memory device in a negative direction;

the negative direction of the shift is selected to compensate for a shift of threshold voltages of memory cells of the memory device in the negative direction caused by charge loss due to data retention; and a magnitude of the negative voltage offset levels increases as the bin number increases from the first bin through higher-numbered bins.

11. A system comprising:

a memory device; and a memory controller coupled to the memory device, the memory controller programmed to:

detect a read-intensive workload for the memory device;

determine whether data stored in the memory device has been exposed to conditions causing errors beyond a correction limit of a valley track module of the memory controller;

responsive to determining the data has been exposed to the conditions, determine a set of read level adjustments for the data;

modify a bin table of the valley track module based on the set of read level adjustments, wherein the bin table stores read voltage offset levels, indexed by bin number and read level; and apply offset voltage levels from the modified bin table sequentially during read operations of the memory device starting from a first bin through higher-numbered bins until an acceptable raw bit error rate (RBER) is achieved.

12. The system of claim 11, wherein to determine the set of read level adjustments, the memory controller is further programmed to measure a shift in a last valley of read levels of the memory device.

13. The system of claim 11, wherein modifying the bin table comprises adjusting offset voltage levels for a penultimate bin and a last bin of the bin table.

14. The system of claim 11, wherein the memory controller is further programmed to estimate a data retention duration based on a selected bin used by the valley track module for read operations of the read-intensive workload.

15. The system of claim 11, wherein the memory controller is further programmed to:

refresh the data retrieved in a read operation for the read-intensive workload in the memory device; and restore default offset voltage levels in the bin table in response to detecting completion of the read-intensive workload.

16. The system of claim 11, wherein the memory device is a quad-level cell (QLC) Not-AND (NAND) flash memory device, and the read-intensive workload comprises a host read operation or a QLC-to-QLC folding operation.

17. The system of claim 11, wherein to determine whether data stored in the memory device has been exposed to conditions causing errors beyond a correction limit, the memory controller is further programmed to analyze performance of initial read attempts using offset voltage levels from bins of the bin table prior to the modifying.

18. A non-transitory computer-readable medium storing instructions that, when executed by a processor, perform operations for adjusting read levels of data in a non-volatile memory system, the operations comprising:

detecting a read-intensive workload for a memory device;

determining whether data stored in the memory device related to the read-intensive workload has been exposed to conditions causing errors beyond a correction limit of a valley track module;

responsive to determining the data has been exposed to the conditions, determining a set of read level adjustments for the data;

modifying a bin table of the valley track module based on the set of read level adjustments, wherein the bin table stores read voltage offset levels, indexed by bin number and read level; and applying, by the valley track module, offset voltage levels from the modified bin table during read operations of the memory device for the read-intensive workload starting from a first bin through higher-numbered bins until an acceptable raw bit error rate (RBER) is achieved.

19. The non-transitory computer-readable medium of claim 18, wherein determining the set of read level adjustments comprises measuring a shift in a last valley of read levels of the memory device, and modifying the bin table comprises adjusting offset voltage levels for a penultimate bin and a last bin of the bin table.

20. The non-transitory computer-readable medium of claim 18, wherein the operations further comprise:

estimating a data retention duration based on a selected bin used by the valley track module for read operations of the read-intensive workload;

refreshing the data retrieved in a read operation for the read-intensive workload in the memory device; and restoring default offset voltage levels in the bin table in response to detecting a completion of the read-intensive workload.

* * * * *